Nov. 7, 1950  S. A. SHAPIRO  2,528,557
REFRIGERANT CONTROL MANIFOLD
Filed Oct. 27, 1944  2 Sheets-Sheet 1

INVENTOR
S. A. SHAPIRO.
BY
ATTORNEY

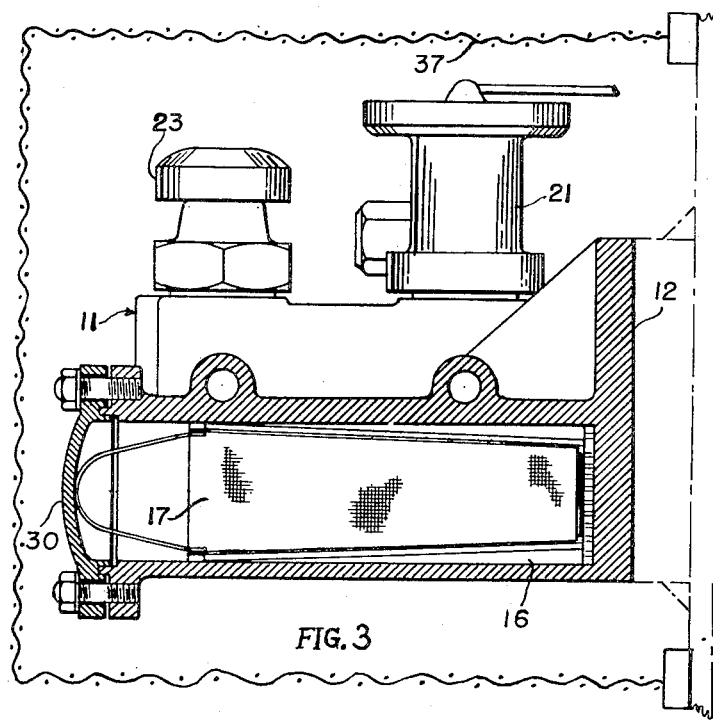
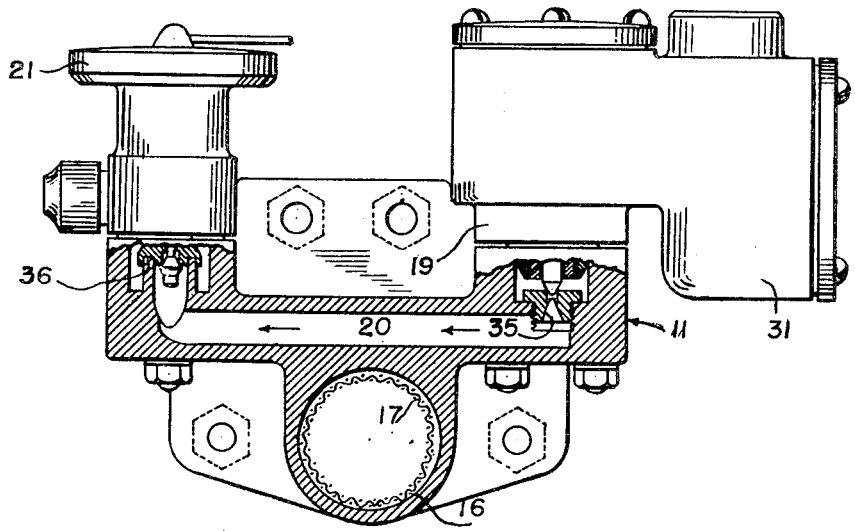

Patented Nov. 7, 1950

2,528,557

UNITED STATES PATENT OFFICE 2,528,557

REFRIGERANT CONTROL MANIFOLD

Samuel A. Shapiro, Bronx, N. Y.

Application October 27, 1944, Serial No. 560,592

11 Claims. (Cl. 62—1)

(Granted under the act of March 3, 1883, as amended April 30, 1928; 370 O. G. 757)

This invention relates to refrigeration systems and more particularly to a control manifold wherein a large number of refrigerant valves and fittings can be incorporated in an improved compact unit.

Refrigeration systems employ a considerable number of valves and controls with attendant fittings and joints, and these devices have heretofore been installed as separate parts of the refrigeration unit dispersed as required throughout the system.

The cluttered assemblage of refrigeration parts thus presented constitutes a serious problem for the refrigeration engineer and installation worker. These devices must be kept accessible for servicing and repair and require considerable room in spaces that are normally crowded with other equipment. This condition is of particular importance aboard ships where refrigeration is employed extensively in magazines, storage, air-cooling systems and the like.

In the installation of refrigeration systems it is ordinarily necessary to make a large number of silver-soldered connections between the respective parts of the refrigeration unit and these connections are extremely difficult to make in confined spaces, as aboard ship. Heretofore, in order to overcome this difficulty, it has been proposed to assemble the refrigeration plant or portions thereof ashore before installation while the connections are accessible, and the several units comprising the system are then assembled together aboard ship.

It will be obvious that leaky joints are particularly dangerous in a refrigeration system, and aboard ship this condition is aggravated greatly by the usual crowded installation conditions. In addition, the permanent nature of silver-soldered connections makes any repair or maintenance operations difficult and requires experienced personnel and ideal conditions for satisfactory servicing of the several units of the system.

Another important consideration in shipboard refrigeration systems is the provision of means whereby essential controls can be replaced or serviced readily by relatively inexperienced personnel with a minimum amount of interference with the operation of the refrigeration unit. The present invention permits such replacement and servicing by inexperienced personnel by incorporating all vital units and connections within a compact manifold that can be removed readily by disconnecting inlet and outlet connections and replacing with a new unit.

It is therefore an object of the present invention to provide a simple, compact and readily serviceable refrigeration unit that embodies in a single monoblock, manifold of homogeneous material the heretofore scattered controls.

Another object is to provide a compact, refrigerant-control manifold that incorporates all of the usual refrigerant system controls and that can be removed and replaced bodily as a service unit.

Another object is to provide means whereby a strainer, a solenoid valve, a thermal expansion valve, and suitable cutout and by-pass valves can be assembled in a single compact unit.

An additional object is to provide a manifold construction that permits unit servicing in the field by inexperienced personnel simply by replacement of a defective manifold by a reconditioned or new manifold. The defective manifold can then be returned as one unit to experienced workmen at an overhaul shop for repair.

Still another object is to provide a manifold constructed in one piece of homogeneous material throughout, said manifold having in its outer surface suitable machined apertures to receive refrigerant fittings and being provided with suitable internal passages connecting said apertures.

Other objects and advantages will be hereinafter more fully described for a complete understanding of the nature, scope and characteristics of this invention, reference can be had to the following description and accompanying drawings, in which latter Fig. 1 is a top plan view of one embodiment of the present invention, showing a manifold with controls in place enclosed in a protecting cage;

Fig. 3 is an elevation partially in section taken along line 3—3 of Fig. 1; and

Fig. 4 is a vertical side elevation taken along line 4—4 of Fig. 1, without an enclosing cage.

Figure 1:
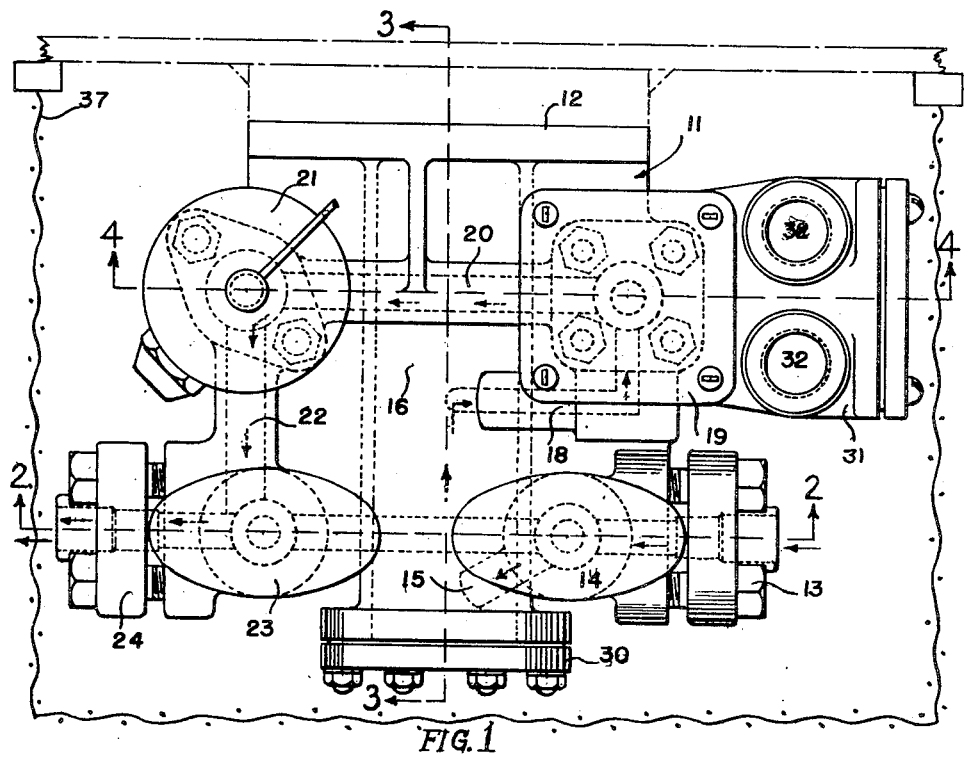

The embodiment illustrated comprises a monoblock manifold 11 formed of forged brass, manganese bronze or other suitable refrigerant-resisting material and is constructed throughout of a single block of homogeneous material. This manifold can be provided with a mounting pad 12 for use in securing the manifold to a wall or bulkhead. The manifold is provided with suitable reenforcing ridges as shown and has a number of cored openings and drilled passages so that refrigerant control valves of standard make can be installed therein.

In the usual refrigeration system there are provided at least the following units or their equivalent: a T connection, a hand cutout valve, a strainer, an electric solenoid valve, a thermal expansion valve, another hand cutout valve, and finally another T fitting. These units are connected together in series relation. From the two T connections above noted, at each end of the series, a separate parallel refrigerant line runs ordinarily through a hand-operated by-pass refrigerant-expansion valve.

The present manifold 11 has all of these units incorporated in the compact relationship shown. In operation, refrigerant enters through coupling 13 and passes through the internal passages shown in Fig. 1 in the path indicated by the dotted arrows. From coupling 13 it passes through cutout valve 14 and through a short passage 15 into a strainer chamber 16 containing a strainer 17. From the rear portion of this chamber it emerges through a passage 18 leading to a solenoid valve 19. This solenoid valve is of the usual type and can be subject to remote control to effect complete interruption of the refrigerant action. From the solenoid valve 19 the refrigerant passes through passage 20 to a thermostatic-expansion valve 21, which can be of the usual type. From valve 21 refrigerant passes through passage 22 and a second cutout valve 23 and finally emerges from coupling 24.

Figure 2:
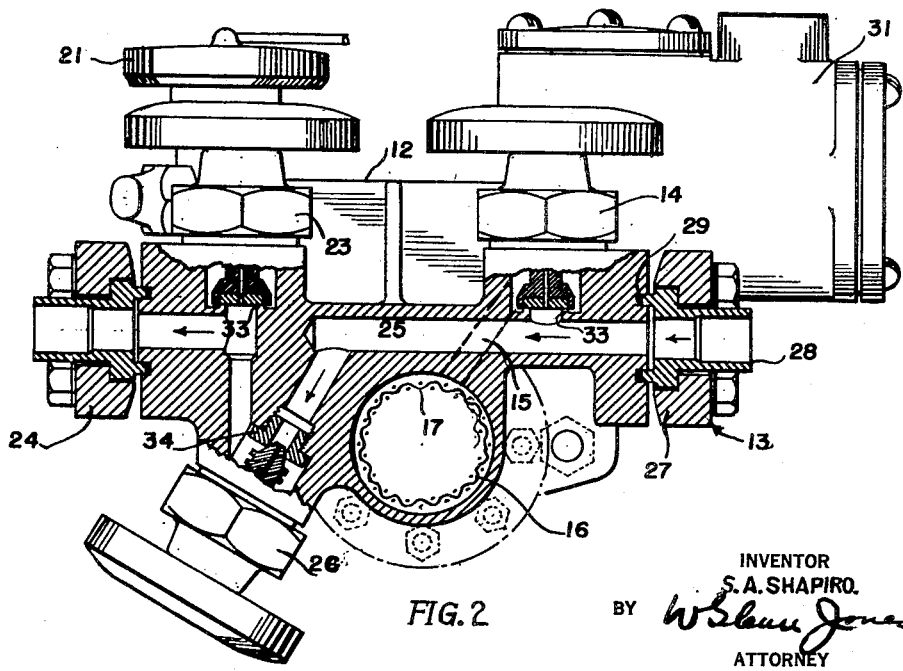
Fig. 2 is a vertical side elevation partially in section taken along line 2—2 of Fig. 1, without an enclosing cage.

An alternative path for the refrigerant is provided in the above construction whenever cutout valves 14 and 23 are both closed. Fig. 2 shows the controls in this position, wherein refrigerant then passes from coupling 13 through a passage 25, the flow being controlled manually by a by-pass valve 26. The by-pass valve 26 constitutes a hand-controlled refrigerant-expansion valve and can be adjusted to regulate the refrigerating action as desired. By use of this parallel arrangement the solenoid and thermal expansion valves can be serviced by qualified personnel without removal of the manifold.

It will be noted that, with the above constructions embodying all of the units in a single integral manifold, a large number of the connections that heretofore afforded great opportunity for leakage and service troubles to develop have been eliminated.

In addition, this construction provides a bodily replaceable unit that can be installed and removed in a minimum amount of time by inexperienced personnel in what might be termed a unit servicing or "package" method of maintenance and repair.

The coupling 13 comprises a collar 27, which is secured over a flared or enlarged end of a refrigerant line 28 and drawn into place by means of screws as shown. A gasket 29 is carried between the circular end of the refrigerant line 28 and the manifold 11. The coupling 24 is of similar construction. These two refrigerant connections are the only ones required for this unit.

The strainer unit 17 shown in detail in Fig. 3, is housed in an elongated opening or recess 16 that extends transversely to the body of the manifold. This construction permits the enlarged strainer to be housed in a compact assemblage as a composite part of the manifold. The side walls of the strainer opening form a reenforcing and supporting structure for the valve seat portions of the manifold. This permits maximum strength with a minimum of manifold material.

Access to the strainer is gained by removal of cover plate 30, Fig. 1.

The solenoid valve 19 has a suitable junction box 31 forming part thereof. Said box is provided with knock-out plugs 32 for use during installation.

The refrigerant-control valves and seatings herein shown are not described in detail, for the present invention resides not in the separate elements but in so combining the operative parts of these valves with integral seats and passages in a single manifold member that the objects and advantages above specified are achieved.

Thus, the cutout valves 14 and 23 are of conventional construction in all moving parts. However, seat portions 33 are formed in the present manifold corresponding to the normal seating elements of such valves to register with the stem-operated portions of the cutout valves and permit the usual cutout operation; likewise, the by-pass valve 26 is provided with a removable insert seat 34 that becomes a part of the manifold casting 11; the solenoid valve 19 cooperates with seat 35 in the casting while the thermal expansion valve 21 operates against a suitably machined seat 36 in the manifold.

By collecting all of the vital fittings together in a compact control manifold of the character described all of these parts of the system can be protected against interference by unauthorized personnel by means of a single, tamper-proof enclosure that can be in the form of a reticulated shield or cage 37 of metal or other suitable material, as shown in Fig. 1. This enclosure can be locked if desired and serves to insure that only qualified maintenance men can gain access to the adjustments enclosed.

From the foregoing description it will be apparent to those skilled in the art that various modifications thereof can be made without departing from the scope of this invention and it is desired, therefore, that the same be limited only by the scope of the appended claims.

The invention described herein may be manufactured and used by or for the Government of the United States of America for governmental purposes without the payment of any royalties thereon or therefor.

I claim:

1. In a refrigerant control device for unit service installation as a part of a refrigerant system the combination of refrigerant flow control elements comprising a cutout valve, a strainer, a solenoid valve, a thermal expansion valve and a second cutout valve, the said control elements all mounted in a single bodily replaceable manifold provided with internal refrigerant conducting passages in series relationships along which the said control elements are positioned, with a by-pass valve and other internal refrigerant conducting passages located in said manifold in substantially parallel relationship to the first series of passages.

2. A manifold for a refrigerating system comprising a mounting base having integral fitting-receiving portions, a plurality of fittings including a first cutout valve, a strainer, a solenoid valve, a thermal expansion valve and a second cutout valve, each of said fittings being mounted in said base in said fitting-receiving portions, said base having internal passages connecting said fittings in the hereinabove-named sequential flow relationship.

3. A manifold for a refrigerating system comprising a mounting base having integral fitting-receiving portions, a plurality of fittings including a first cutout valve, a strainer, a solenoid valve, a thermal expansion valve and a second cutout valve, each of said fittings being mounted in said base in said fitting-receiving portions, said base having internal passages connecting said fittings in the hereinabove-named sequential flow relationship, and a by-pass valve in a passage in said block in parallel with said above-named fittings.

4. In a refrigerant control device, a first cutout valve, a strainer, a solenoid valve, a thermal expansion valve, and a second cutout valve all mounted in a manifold having a first series of internal refrigerant-conducting passages in series relationship along which the abovenamed elements are all positioned in the sequence named, and a by-pass valve and other refrigerant-conducting passages in said manifold in parallel with the first series of passages.

5. A manifold for a refrigerating system comprising a block, means to couple said block to a first refrigerant line, a first cutout valve in said block in communication with said first coupling means, a strainer chamber in said block in communication with said first cutout valve, a strainer located in said chamber, a solenoid valve in said block in communication with said strainer chamber, a thermostatic-expansion valve in said block in communication with said solenoid valve, a second cutout valve in said block in communication with said thermostatic-expansion valve, and means to couple said block to a second refrigerant line, said second coupling means being in communication with said second cutout valve.

6. A manifold for a refrigerating system comprising a block, means to couple said block to a first refrigerant line, a first cutout valve in said block in communication with said first coupling means, a strainer chamber in said block in communication with said first cutout valve, a strainer located in said chamber, a solenoid valve in said block in communication with said strainer chamber, a thermostatic-expansion valve in said block in communication with said solenoid valve, a second cutout valve in said block in communication with said thermostatic-expansion valve, means to couple said block to a second refrigerant line, said second coupling means being in communication with said second cutout valve, and a by-pass valve in said block in communication with said first coupling means and with said second coupling means.

7. A manifold for a refrigerating system comprising a block of refrigerant-resisting material, means to secure said block to a bulkhead, means to couple said block to a first refrigerant line, a first cutout valve in said block in communication with said first coupling means, a strainer chamber in said block in communication with said first cutout valve, a strainer located in said chamber, a solenoid valve in said block in communication with said strainer chamber, means to control said solenoid valve remotely, a thermostatic-expansion valve in said block in communication with said solenoid valve, a second cutout valve in said block in communication with said thermostatic-expansion valve, means to couple said block to a second refrigerant line, said second coupling means being in communication with said second cutout valve, and a by-pass valve in said block in communication with said first coupling means and with said second coupling means.

8. A manifold for a refrigerating system comprising a block of refrigerant-resisting material, means to secure said block to a standard, means to couple said block to a first refrigerant line, a first cutout valve in said block in communication with said first coupling means, a strainer chamber in said block in communication with said first cutout valve, a strainer located in said chamber, a solenoid valve in said block in communication with said strainer chamber, means to control said solenoid valve remotely, a thermostatic-expansion valve in said block in communication with said solenoid valve, a second cutout valve in said block in communication with said thermostatic-expansion valve, means to couple said block to a second refrigerant line, said second coupling means being in communication with said second cutout valve, and a hand-controlled refrigerant expansion valve in said block in communication with said first coupling means and with said second coupling means.

9. In a refrigerating system, a block, a first collar secured over an enlarged end of a first refrigerant line and secured to said block by a plurality of screws therethrough threaded into said block, a first cutout valve in said block in communication with said line, a strainer chamber in said block in communication with said first cutout valve, a strainer located in said chamber, a solenoid valve in said block in communication with said strainer chamber, means to control said solenoid valve remotely, a thermostatic-expansion valve in said block in communication with said solenoid valve, a second cutout valve in said block in communication with said thermostatic-expansion valve, a second collar secured over an enlarged end of a second refrigerant line and secured to said block by a plurality of screws therethrough threaded into said block, said collar being in communication with said second cutout valve, and a by-pass valve in said block in communication with said first collar and said second collar.

10. A manifold for a refrigerating system comprising a block, means to couple said block to a first refrigerant line, a first cutout valve in said block in communication with said first coupling means, an elongated integral tube extending transversely to the body of said block, a strainer carried in said tube, the side walls of said tube forming a reenforcing structure for the valve-seat portions of said block, a solenoid valve in said block in communication with said strainer chamber, means to control said solenoid valve remotely, a thermostatic-expansion valve in said block in communication with said solenoid valve, a second cutout valve in said block in communication with said thermostatic-expansion valve, means to couple said block to a second refrigerant line, said second coupling means being in communication with said second cutout valve, and a by-pass valve in said block in communication with said first coupling means and with said second coupling means.

11. A manifold for a refrigerating system comprising a block, means to couple said block to a first refrigerant line, a first cutout valve in said block in communication with said first coupling means, a seat integral with said black providing a seating element for said cutout valve, a strainer chamber in said block in communication with said first cutout valve, a solenoid valve in said block in communication with said strainer chamber, means to control said solenoid valve remotely, a thermostatic-expansion valve in said block in communication with said solenoid valve, a second cutout valve in said block in communication with said thermostatic-expansion valve, a seat integral with said block providing a seating element for said second cutout valve, means to couple said block to a second refrigerant line, said second coupling means being in communication with said second cutout valve, and a by-pass valve in said block in communication with said first coupling means and with said second coupling means.

SAMUEL A. SHAPIRO.

REFERENCES CITED

The following references are of record in the file of this patent:

UNITED STATES PATENTS

| Number | Name | Date |
|---|---|---|
| 934,675 | Landgraf | Sept. 21, 1909 |
| 1,097,780 | Warnock et al. | May 26, 1914 |
| 1,147,664 | Ward | July 20, 1915 |
| 1,427,107 | Kaplan | Aug. 29, 1922 |
| 1,564,777 | Groh | Dec. 8, 1925 |
| 1,895,346 | Rice | Jan. 24, 1933 |
| 2,166,530 | Morgan | July 18, 1939 |
| 2,170,307 | Ohme | Aug. 22, 1939 |
| 2,195,925 | Hoesel | Apr. 2, 1940 |
| 2,247,141 | Twyman | June 24, 1941 |
| 2,309,405 | Matteson | Jan. 26, 1943 |
| 2,323,480 | MacDougall | July 6, 1943 |